(12) United States Patent
Zhang et al.

(10) Patent No.: US 10,931,552 B1
(45) Date of Patent: Feb. 23, 2021

(54) CONNECTIVITY CHECK WITH SERVICE INSERTION

(71) Applicant: VMWARE, INC., Palo Alto, CA (US)

(72) Inventors: Yuxiao Zhang, Palo Alto, CA (US);
Rahul Mishra, Palo Alto, CA (US);
Pierluigi Rolando, Palo Alto, CA (US);
Kantesh Mundaragi, Bangalore (IN);
Raju Koganty, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/813,775

(22) Filed: Mar. 10, 2020

(30) Foreign Application Priority Data

Jan. 23, 2020 (IN) .............................. 202041003006

(51) Int. Cl.
| | | |
|---|---|---|
| *G06F 15/173* | (2006.01) | |
| *G06F 15/16* | (2006.01) | |
| *G06F 15/177* | (2006.01) | |
| *H04L 12/26* | (2006.01) | |
| *H04L 29/12* | (2006.01) | |
| *H04L 29/06* | (2006.01) | |

(52) U.S. Cl.
CPC .......... *H04L 43/0811* (2013.01); *H04L 43/50* (2013.01)

(58) Field of Classification Search
USPC ................................ 709/223–228, 238, 239
See application file for complete search history.

(56) References Cited

U.S. PATENT DOCUMENTS

| | | | | |
|---|---|---|---|---|
| 6,262,976 B1* | 7/2001 | McNamara | ............. | H04L 45/00 370/254 |
| 8,160,055 B1* | 4/2012 | Nadeau | .................... | H04L 45/68 370/351 |
| 8,355,332 B2* | 1/2013 | Beaudette | ............... | H04L 43/50 370/248 |
| 8,885,487 B2* | 11/2014 | Voit | .................... | H04L 41/5038 370/248 |
| 9,083,587 B2* | 7/2015 | Babu | ................... | H04L 61/2514 |
| 9,565,163 B1* | 2/2017 | Arvind | ................ | H04L 63/0245 |
| 9,893,968 B1* | 2/2018 | Nagargadde | ........ | H04L 43/0811 |
| 10,212,161 B1* | 2/2019 | Schaefer | ............... | H04W 12/08 |
| 10,582,274 B2* | 3/2020 | Kwak | ................... | H04N 21/462 |
| 10,637,758 B2* | 4/2020 | Dongre | ................. | H04L 43/065 |
| 2011/0222413 A1* | 9/2011 | Shukla | ................ | H04L 43/0811 370/241.1 |

\* cited by examiner

*Primary Examiner* — Jude Jean Gilles
(74) *Attorney, Agent, or Firm* — Su IP Consulting (57) ABSTRACT

Example methods and systems for connectivity check with service insertion have been disclosed. One example may comprise a computer system receiving a connectivity check packet that is injected for forwarding along a service path between a source virtualized computing instance and a destination virtualized computing instance. In response to detecting a connectivity issue associated with the service path, first report information identifying the first service virtualized computing instance and an observation that the connectivity check packet is dropped may be generated and sent. Otherwise, the connectivity check packet may be forwarded towards a second virtualized computing instance, being a next-hop on the service path, or the destination virtualized computing instance. Second report information identifying the first service virtualized computing instance and an observation that the connectivity check packet is forwarded may be generated and sent.

21 Claims, 7 Drawing Sheets

*Connectivity check packets*

| Packet | Content | |
|---|---|---|
| P1x | (SPI=1,SI=3,TTL=5);(TF_FLAG=1,UUID) | ~610 |
| P1y | (SPI=1,SI=2,TTL=4);(TF_FLAG=1,UUID);DROP_PKT=0 | ~620 |
| P2x | (SPI=1,SI=2,TTL=4);(TF_FLAG=1,UUID) | ~630 |
| P2y | (SPI=1,SI=1,TTL=3);(TF_FLAG=1,UUID);DROP_PKT=0 | ~640 |
| P3x | (SPI=1,SI=1,TTL=3);(TF_FLAG=1,UUID) | ~650 |
| P3y | (SPI=1,SI=0,TTL=2);(TF_FLAG=1,UUID);DROP_PKT=1 | ~710 |

*Report information*

| Observation point | Observation type | |
|---|---|---|
| LP5 | INJECTED | ~451 |
| DFW5 | RECEIVED+FORWARDED | ~452 |
| CLF-VM5 | RECEIVED+FORWARDED;RULE=10;(SPI=1,SI=3,TTL=5) | ~453 |
| PROXY-SVM1 | RECEIVED+FORWARDED;(SPI=1,SI=2,TTL=4) | ~454 |
| SVM1 | RECEIVED+FORWARDED;(SPI=1,SI=2,TTL=4) | ~670 |
| PROXY-SVM2 | RECEIVED+FORWARDED;(SPI=1,SI=1,TTL=3) | ~455 |
| SVM2 | RECEIVED+FORWARDED;(SPI=1,SI=1,TTL=3) | ~680 |
| PROXY-SVM3 | RECEIVED+FORWARDED;(SPI=1,SI=0,TTL=2) | ~456 |
| SVM3 | DROPPED;(SPI=1,SI=0,TTL=2) | ~720 |

Fig. 7

CONNECTIVITY CHECK WITH SERVICE INSERTION

RELATED APPLICATIONS

Benefit is claimed under 35 U.S.C. 119(a)-(d) to Foreign Application Serial No. 202041003006 filed in India entitled "CONNECTIVITY CHECK WITH SERVICE INSERTION", on Jan. 23, 2020, by VMware, Inc., which is herein incorporated in its entirety by reference for all purposes.

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, a service chain may be deployed to provide a range of services to other virtualized computing instances in the SDN environment. However, packet processing using service chains might be affected by various network issues. It is desirable to be able to diagnose network issues associated with service chains.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used throughout the present disclosure to describe various elements, these elements should not be limited by these terms. These terms are used to distinguish one element from another. For example, a first element may be referred to as a second element, and vice versa.

Challenges relating to network troubleshooting and diagnosis will now be explained in more detail using FIG. 1, which is a schematic diagram illustrating example software-defined networking (SDN) environment 100 in which connectivity check with service insertion may be performed. Depending on the desired implementation, SDN environment 100 may include additional and/or alternative components than that shown in FIG. 1. SDN environment 100 includes multiple hosts 110A-C that are inter-connected via physical network 104. In practice, SDN environment 100 may include any number of hosts (also known as a "host computers", "host devices", "physical servers", "server systems", "transport nodes," etc.), where each host may be supporting tens or hundreds of virtual machines (VMs).

Each host 110A/110B/110C may include suitable hardware 112A/112B/112C and virtualization software (e.g., hypervisor-A 114A, hypervisor-B 114B, hypervisor-C 114C) to support various VMs. For example, hosts 110A-C may support respective VMs 131-136. Hypervisor 114A/114B/114C maintains a mapping between underlying hardware 112A/112B/112C and virtual resources allocated to respective VMs. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). The virtual resources may include virtual CPU, guest physical memory, virtual disk, virtual network interface controller (VNIC), etc. Hardware resources may be emulated using virtual machine monitors (VMMs). For example in FIG. 1, VNICs 151-156 are virtual network adapters for VMs 131-136, respectively, and are emulated by corresponding VMMs (not shown for simplicity) instantiated by their respective hypervisor at respective host-A 110A, host-B 110B and host-C 110C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical port. For example, logical switch ports 161-166 (see "LP1" to "LP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of a corresponding virtualized computing instance (e.g., when the source host and destination host do not have a distributed virtual switch spanning them).

To protect VMs 131-136 against security threats caused by unwanted packets, hypervisors 114A-C may implement firewall engines to filter packets. For example, distributed firewall engines 171-176 (see "DFW1" to "DFW6") are configured to filter packets to, and from, respective VMs 131-136 according to firewall rules. In practice, network packets may be filtered according to firewall rules at any point along a datapath from a VM to corresponding physical NIC 124A/124B/124C. In one embodiment, a filter component (not shown) is incorporated into each VNIC 151-156 that enforces firewall rules that are associated with the endpoint corresponding to that VNIC and maintained by respective distributed firewall engines 171-176.

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (Geneve), etc. For example, VXLAN is a layer-2 overlay scheme on a layer-3 network that uses tunnel encapsulation to extend layer-2 segments across multiple hosts which may reside on different layer 2 physical networks.

SDN manager 180 and SDN controller 182 are example network management entities in SDN environment 100. One example of an SDN controller is the NSX controller component of VMware NSX® (available from VMware, Inc.) that operates on a central control plane. SDN controller 182 may be a member of a controller cluster (not shown for simplicity) that is configurable using SDN manager 180 operating on a management plane (MP). Network management entity 180/182 may be implemented using physical machine(s), VM(s), or both. Logical switches, logical routers, and logical overlay networks may be configured using SDN controller 182, SDN manager 180, etc. To send or receive control information, a local control plane (LCP) agent (not shown) on host 110A/110B/110C may interact with central control plane (CCP) module (not shown) at SDN controller 182 via control-plane channel 101/102/103.

Hosts 110A-C may also maintain data-plane connectivity among themselves via physical network 104 to facilitate communication among VMs located on the same logical overlay network. Hypervisor 114A/114B/114C may implement a virtual tunnel endpoint (VTEP) (not shown) to encapsulate and decapsulate packets with an outer header (also known as a tunnel header) identifying the relevant logical overlay network (e.g., using a VXLAN or "virtual" network identifier (VNI) added to a header field). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B), hypervisor-C 114C implements a third VTEP with (IP-C, MAC-C, VTEP-C), etc. Encapsulated packets may be sent via an end-to-end, bi-directional communication path (known as a tunnel) between a pair of VTEPs over physical network 104.

In SDN environment 100, multiple VMs may be chained or grouped together to form a "service chain" that provides service(s) to other VMs. A service chain may be represented using $S=\{VM_j\}$, where $j=1, \ldots, N$ to implement a sequence of $N \geq 2$ services. For example, a service chain may include service nodes in the form of service VMs (SVMs) 131-134. A service chain may be identified using a service chain identifier (SCID), such as SCID=10. Within a service chain, a service path may be uniquely identified using a service path identifier (SPI), each service (i.e., hop) having a unique service index (SI) within a service path.

For example, a first service path with SPI=1 may include {SVM1, SVM2, SVM3} in a pre-defined order, where SVM1 131 provides a first service with SI=3 for, SI=2 for SVM2 132 and SI=1 for SVM3 133. A second service path with SPI=2 may include {SVM1, SVM2, SVM4}. Note that SVM3 133 and SVM4 134 may provide the same service and selected through load balancing. Alternatively, they may provide different services and selected using any suitable service insertion policy. This way, east-west service insertion may be implemented by processing a flow of packets between a source (e.g., VM5 135) and a destination (e.g., VM6 136) using the first or second service path.

In practice, traffic among of VMs 131-136 may be affected by various network issues in SDN environment 100. However, troubleshooting packet paths is not an easy task, especially when service insertion is involved. One reason is that service insertion is generally implemented using various SVMs that are deployed on various hosts. As SDN environment 100 increases in scale and complexity, any difficulty involved in network troubleshooting and diagnosis may impact the performance of VMs 131-136 and hosts 110A-C, which is undesirable and leads to increased system downtime.

Connectivity Check with Service Insertion

According to examples of the present disclosure, connectivity check with service insertion may be performed to facilitate network troubleshooting and diagnosis. Using examples of the present disclosure, a connectivity check packet may be injected for forwarding from a source (e.g., VM5 135) to a destination (e.g., VM6 136) via observation point(s) along a service path. Examples of the present disclosure may be implemented using hosts 110A-C, such as using service insertion proxies 141-144 associated with respective SVMs 131-134 and service insertion classifiers (labelled "CLF") 145-146 associated with respective guest VMs 135-136. In practice, proxies 141-144 and classifiers 145-146 may be implemented along any suitable input/output (I/O) chains at respective hypervisors 114A-C.

As used herein, the term "service path" may refer generally to a path between a source and a destination through which packets are steered to provide service(s) to the packets. A service path may include at least one "service virtualized computing instance" configured to provide a "service." The term "service" may be any suitable networking or non-networking service, such as firewall, load balancing, network address translation (NAT), intrusion detection system (IDS), intrusion prevention system (IPS), deep packet inspection (DPI), traffic shaping, traffic optimization, packet header enrichment or modification, packet tagging, content filtering, etc. It should be understood that the operation(s) associated with a service may or may not modify the content (e.g., header(s) or payload) of the packets.

Figure 2:
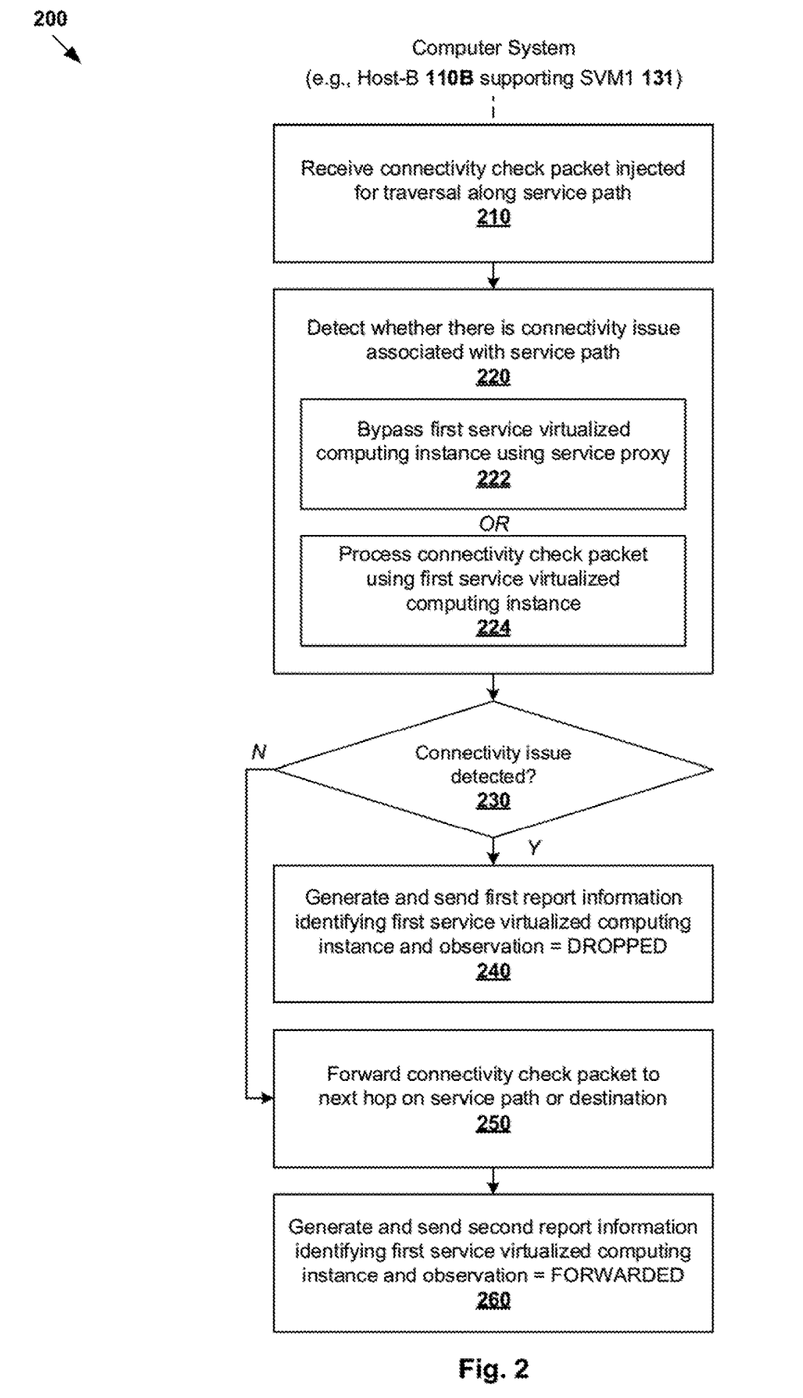
FIG. 2 is a flowchart of an example process for a computer system to perform connectivity check with service insertion in an SDN environment.

In more detail, FIG. 2 is a flowchart of example process 200 for a computer system to perform connectivity check with service insertion in SDN environment 100. Example process 200 may include one or more operations, functions, or actions illustrated by one or more blocks, such as 210 to 260. The various blocks may be combined into fewer blocks, divided into additional blocks, and/or eliminated depending on the desired implementation. In the following, various examples will be described using host-B 110B as "computer system," SVM1 131 as "first service virtualized computing instance," SVM2 132 as "second service virtualized computing instance," VM5 135 as "source virtualized computing instance" and VM6 136 as "destination virtualized computing instance,"

At 210 and 220 in FIG. 2, in response to receiving a connectivity check packet, it is determined whether there is a connectivity issue associated with a service path. In practice, SDN manager 180 may instruct (see 190 in FIG. 1) host-A 110A to inject a connectivity check packet (see "P1" 191), such as at LP1 161 connected to source=VM5 135 for forwarding along a service path to destination=VM6 136. The service path may include {SVM1, SVM2, SVM3} belonging to a service chain.

At 220 (yes) and 230 in FIG. 2, in response to detecting a connectivity issue associated with the service path, host-B 110B may generate and send first report information to SDN manager 180. The first report information may identify SVM1 131 located on the service path, such as using (SI, SPI) associated with SVM1 131. The first report information may also include observation=DROPPED indicating that packet "P1" 191 is dropped at host-B 110B.

Otherwise, at 220 (no connectivity issue), 240 and 250 in FIG. 2, host-B 110B may forward the connectivity check packet (see "P2" 192) towards next hop=SVM2 132, as well as generating and sending second report information to SDN manager 180. The second report information may identify SVM1 131 located on the service path, such as using (SI, SPI) associated with SVM1 131. The second report information may also include observation=FORWARDED indicating that the connectivity check packet is forwarded.

Figure 1:
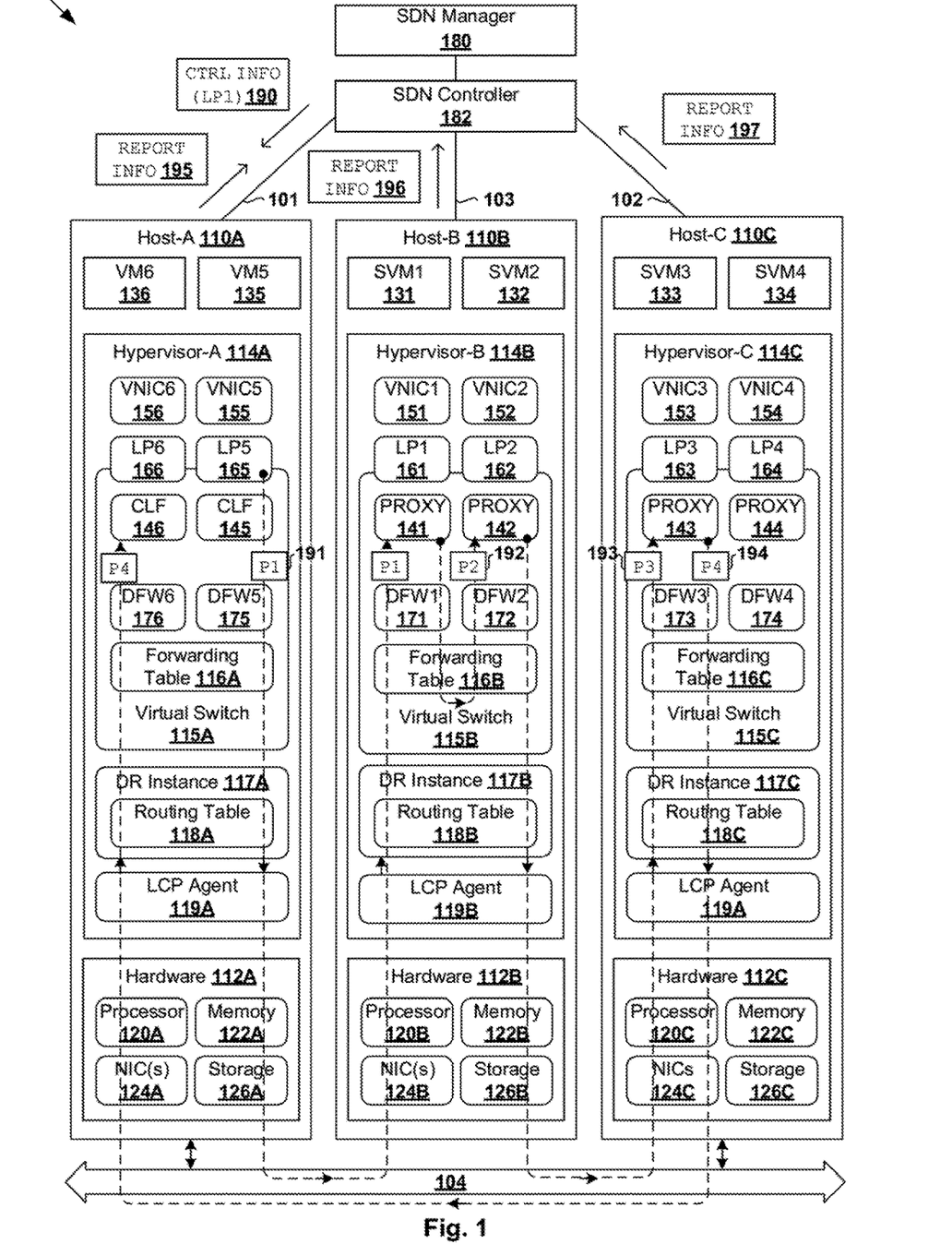
FIG. 1 is a schematic diagram illustrating an example software-defined networking (SDN) environment in which connectivity check with service insertion may be performed.

In the example in FIG. 1, SDN manager 180 may determine a connectivity status for (source=VM5 135, destination=VM6 136) by aggregating and analyzing report information 195-197 from respective hosts 110A-C. Report information 195-197 may be generated by various observation points as a connectivity check packet passes through them. As used herein, the term "observation points" may refer generally to a predefined set of logical and/or physical locations at which report information may be generated and sent between a pair of virtualized computing instances (e.g., VM5 135 and VM6 156). The observation points may be selected by users (e.g., network administrators or designers) based on any suitable criteria, such as their relevance among all possible locations in SDN environment. For example, an observation point may be selected when a previous point would provide no additional information to facilitate a connectivity check.

For example, an observation point may be a physical entity, such as physical NIC 124A/124B/124C. Alternatively, an observation point may be a logical entity. On host-A 110A supporting source VM5 135, for example, a logical observation point may be LP5 165, VNIC5 155, service insertion classifier 145, DFW engine 175, etc. On host-B 110B supporting SVM1 131, a logical observation point may be LP1 161, VNIC1 151, service insertion proxy 141, DFW engine 171, etc. A logical observation point may also be a logical forwarding element, such as logical switch, logical router, etc.

As will be described using FIG. 3 (see 331), FIG. 4 and FIG. 5 below, one approach for connectivity issue detection at block 220 may involve bypassing SVM 131/132/133. In this case, it is not necessary for service insertion proxy 141/142/143 does not forward the connectivity check packet to SVM 131/132/133, such as to reduce the processing burden of SVMs 131-133.

As will be described using FIG. 3 (see 332), FIG. 6 and FIG. 7 below, another approach connectivity issue detection at block 220 may involve SVM 131/132/133 processing the connectivity check packet according to a service. In this case, based on a processed packet from SVM 131/132/133, proxy 141/142/143 may detect the connectivity issue (e.g., based on action DROP_PKT) and drop the processed packet. The "connectivity issue" may be caused by various reasons, such as hardware failure, software failure, network failure, network congestion, firewall rule, invalid service path, SVM failure, invalid logical network configuration, a combination thereof, etc.

Example Connectivity Checks

Figure 3:
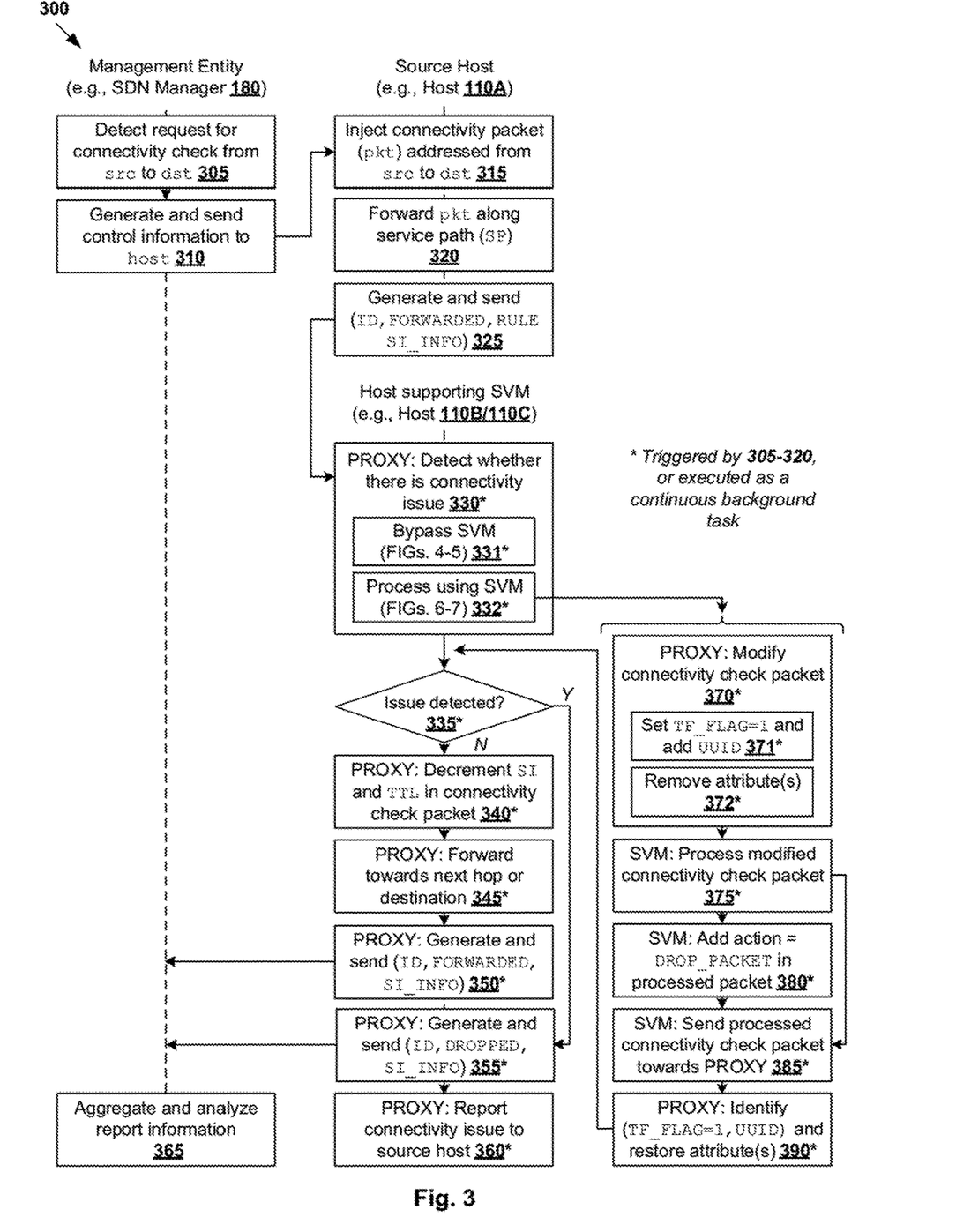
FIG. 3 is a schematic diagram illustrating an example detailed process for a computer system to perform connectivity check with service insertion in an SDN environment.

FIG. 3 is a flowchart of example process 300 for a computer system to perform connectivity check with service insertion in SDN environment 100. Example process 300 may include one or more operations, functions, or actions illustrated by one or more blocks, such as 305 to 395. The various blocks may be combined into fewer blocks, divided into additional blocks, and/or eliminated depending on the desired implementation. The example in FIG. 3 will be explained using FIG. 4, which is a schematic diagram illustrating first example connectivity check with service insertion in which no connectivity issue is detected. In practice, blocks 330-390 may be triggered by a connectivity check packet (see 410 in FIG. 4) injected at source host-A 110A, or independently executed as part of a background task to monitor connectivity over a service path.

(a) Connectivity Check Configuration

At 305 in FIG. 3, SDN manager 180 receives a user's request to perform a connectivity check between source=VM5 135 and destination=VM6 136. This is to trace a service path between VM5 135 and VM5 155 to determine whether they are connected and/or SVMs location on the service path are up and running. In practice, the request may be received from a user device (e.g., operated by a network administrator) via any suitable interface supported by SDN manager 180, such as graphical user interface (GUI), command-line interface (CLI), application programming interface (API) calls, etc.

At 310 in FIG. 3, in response to receiving the user's request, SDN manager 180 may identify transport node=host-A 110A supporting source=VM5 135. For example, block 310 may involve SDN manager 180 generating and sending a query to SDN controller 182 to identify host-A 110A. Further, SDN manager 180 generates and sends control information to instruct host-A 110A to inject a connectivity check packet (see "P1" 410 in FIG. 4) specifying (source IP address=IP-5, destination IP address=IP-6) associated with respective VM5 135 and VM6 136.

In one example, packet "P1" 410 may be generated by SDN manager 270. In this case, the control information at block 315 includes packet "P1" 410 and an instruction for host-A 110A to inject it at logical port=LP1 151. Alternatively, the control information may be an instruction for host-A 110A to generate and inject the packet. "P1" 410 may be injected any suitable point, such as at logical port=LP5 165 connected to VM5 135.

(b) Service Insertion Classifiers

At 315-320 in FIG. 3, host-A 110A may inject and forward connectivity check packet 410 along a service path between source=VM5 135 and destination=VM6 136. In practice, the service path may be selected based on a service insertion rule. Here, the term "service insertion rule" or "service insertion policy" may refer generally to a rule (e.g., table entry) specifying match field(s) to be matched to characteristic(s) of a packet, and an action that is performed when a match is found. Any suitable characteristic(s) may be matched, such as five-tuple information (e.g., source IP address and port number, destination IP address and port number and protocol) in connectivity check packet 410.

For example, a service insertion rule matched to "P1" 410 may instruct service insertion classifier 145 to perform action=forward packet along a service path that includes {SVM1, SVM2, SVM3}. In this case, "P1" 410 may be forwarded towards SVM1 131 on host-B 110B. Packet "P1" 410 may include any suitable "service insertion information" identifying service path={SVM1, SVM2, SVM3}, such as SPI=1, SI=3, TTL (i.e., time to live)=5, etc. As will be described below, SI and TTL may be decremented at each SVM along the service path.

Packet "P1" 410 may also include attributes(s) to indicate that it is a connectivity check packet. Depending on the desired implementation, host-A 110A and host-B 110B may be connected via a logical overlay network. In this case, to reach SVM1 131 supported by host-B 110B, packet P1 410 may be encapsulated with an outer header (e.g., Geneve encapsulation) specifying source information (VTEP IP address=IP-A) and destination information (VTEP IP address=IP-B) associated with respective host-A 110A and host-B 110B.

Further, at 325 in FIG. 3, host-A 110A may generate and send report information (see 451-453) to SDN manager 180 to report that packet "P1" 410 has been injected and forwarded. In practice, observation point(s) along a datapath maybe configured to send report information or path information in the form of (ID, STATUS). The "ID" may include any suitable information identifying its sender, such as a unique ID, name, type (e.g., physical or logical entity, logical switch port, logical switch, logical router port, logical router, DFW engine, service insertion classifier, service insertion proxy, gateway, etc.). The "STATUS" may be "INJECTED," "RECEIVED," "FORWARDED," "DELIVERED," "DROPPED," etc. The report information may also include a timestamp, transport node ID, VNI, etc.

Figure 4:
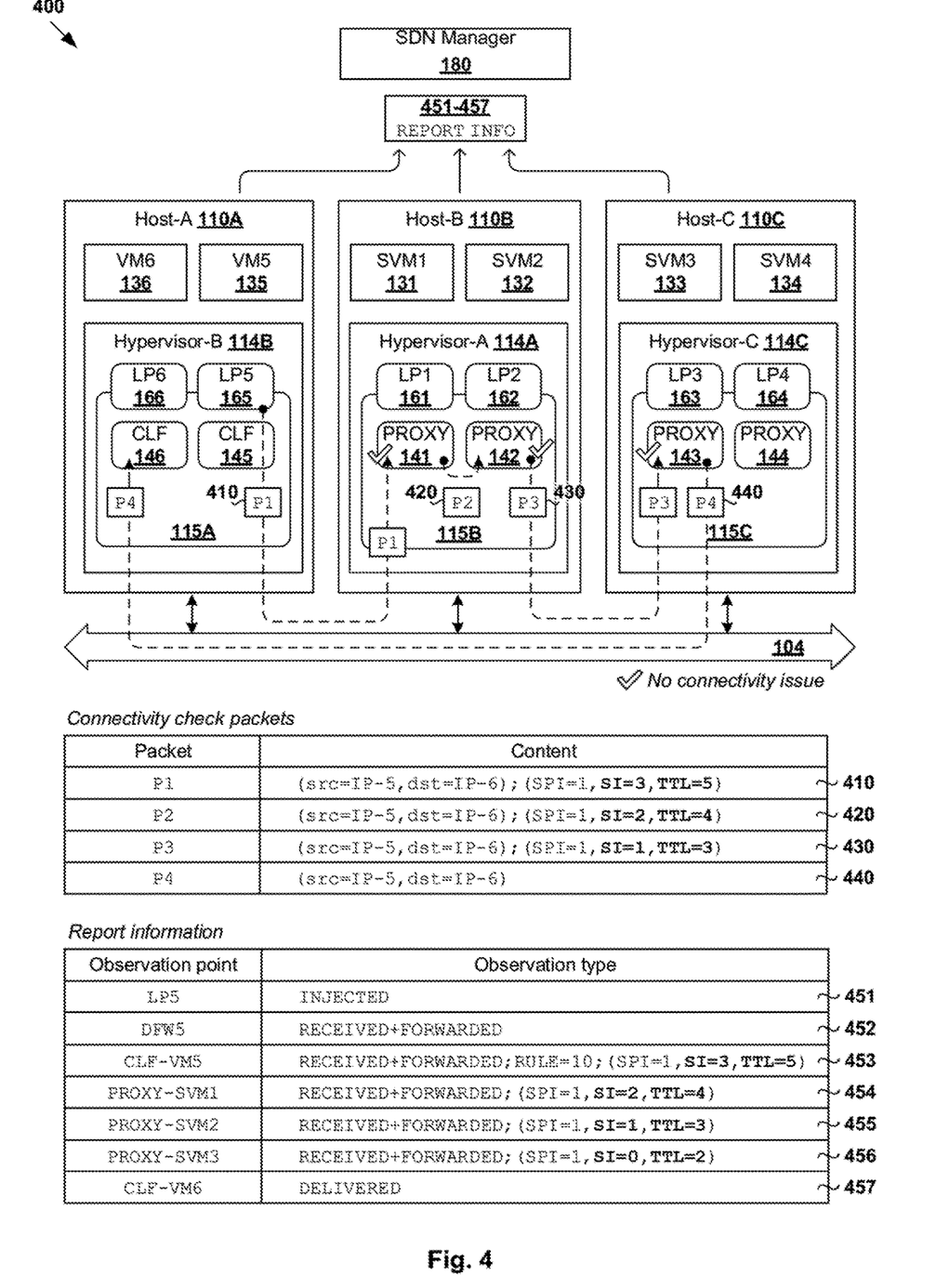
FIG. 4 is a schematic diagram illustrating a first example connectivity check with service insertion in which no connectivity issue is detected.

In the example in FIG. 4, SDN manager 180 may receive report information 451-453 from various observation points on host-A 110A. At 451, LP5 165 associated with VM5 135 reports (ID=LP1, STATUS=INJECTED) to indicate a physical injection packet "P1" 410. At 452, DFWS 175 associated with VM5 135 reports (ID=DFWS, STATUS=RECEIVED+FORWARDED). At 453, classifier 145 reports (ID=CLASSIFIER-VM5, STATUS=RECEIVED+FORWARDED), service insertion rule (e.g., RULE ID=10) as well as service insertion information (e.g., SPI=1, SI=3, TTL=5). In other words, report information 451-453 indicates no connectivity issue at various observation points on host-A 110A. In practice, the service insertion information may specify any suitable information identifying an observation point associated with an SVM. Other examples may include a service MAC address, a universally unique identifiers (UUID) associated with VNIC 151, SVM1 131, a service instance or instance runtime representing SVM1 131. For example, the service insertion information may include SERVICE_MAC=MAC-SVM1 (not shown), where MAC-SVM1 is the MAC address of SVM1 131.

(c) Service Insertion Proxies

At 330 in FIG. 3, in response to receiving packet "P1" 410, first proxy 141 on host-B 110B may detect whether there is any connectivity issue. According to a first example (see 331), SVM1 131 may be bypassed in that first proxy 141 does not forward packet "P1" 410 to SVM1 131 for processing in the example in FIGS. 4-5. A second example (see 332) will be explained below using FIGS. 6-7.

At 335 and 340, in response to no connectivity issue is detected (e.g., not dropped), first proxy 141 may generate packet "P2" 420 by decrementing SI (i.e., from 3 to 2) and TTL (i.e., from 5 to 4) in packet "P1" 410. At 350, packet "P2" 430 may be forwarded to the next hop=SVM2 132 along the service path. Since SVM2 132 is also supported by host-B 110B, encapsulation is not required. At 355, first proxy 141 may generate and send report information (see 454) specifying (ID=PROXY-SVM1, STATUS=RECEIVED+FORWARDED) and service insertion information (SPI=1, SI=2, TTL=4) to SDN manager 180.

At second proxy 142 for SVM2 132, packet "P2" 420 may be processed according to blocks 335-355. In the example in FIG. 4, in response to detecting no connectivity issue, second proxy 142 may generate packet "P3" 430 by decrementing SI (i.e., from 2 to 1) and TTL (i.e., from 4 to 3) in "P2" 420, and forward it to the next hop=SVM3 133 on the service path. Since SVM3 133 is supported by host-C 110C, "P2" 420 may be encapsulated with an outer header specifying (source VTEP IP-B, destination VTEP IP-C) associated with respective host-B 110B and host-C 110C. Second proxy 142 may also send report information (see 455) specifying (ID=PROXY-SVM2, STATUS=RECEIVED+FORWARDED) and updated service insertion information (SPI=1, SI=1, TTL=3).

At third proxy 143 for SVM3 133, packet "P3" 430 may be processed according to blocks 335-355. In the example in FIG. 4, in response to detecting no connectivity issue, third proxy 143 may generate packet "P4" 440 by decrementing SI (i.e., from 1 to 0) and TTL (i.e., from 4 to 2) in "P3" 430. Since SVM3 133 provides the final service on the service path, packet "P4" 440 is sent to destination=VM6 136. Report information (see 456) specifying (ID=PROXY-SVM2, STATUS=RECEIVED+FORWARDED) and updated service insertion information (SPI=1, SI=1, TTL=3, SERVICE_MAC=MAC-SVM3) is also sent to SDN manager 180.

To reach host-A 110A, packet "P4" 440 may be encapsulated with an outer header specifying (source VTEP IP-C, destination VTEP IP-A) associated with respective host-C 110C and host-A 110A. Report information (see 441) specifying (ID=PROXY-SVM3, STATUS=RECEIVED+FORWARDED) and updated service insertion information (SI=0, TTL=2) is also sent to SDN manager 180. At destination VM6 136, packet "P4" 440 may be processed by service insertion classifier 146. In response to detecting packet "P4" 440, service insertion classifier 146 may generate and send report information (see 457) specifying (ID=CLASSIFIER-VM6, STATUS=DELIVERED).

At SDN manager 180, report information 451-457 from service insertion proxies 141-143 and classifiers 145-146 may be aggregated and analyzed to determine that there is no connectivity issue between source VM5 135 and destination VM6 136. To review the connectivity check result, a user may access aggregated report information 401-407 via any suitable user interface supported by SDN manager 180. Based on report information 401-407, the packet traversal chain, services in that chain and each service's supporting host may be identified.

(c) Failure Handling

Figure 5:
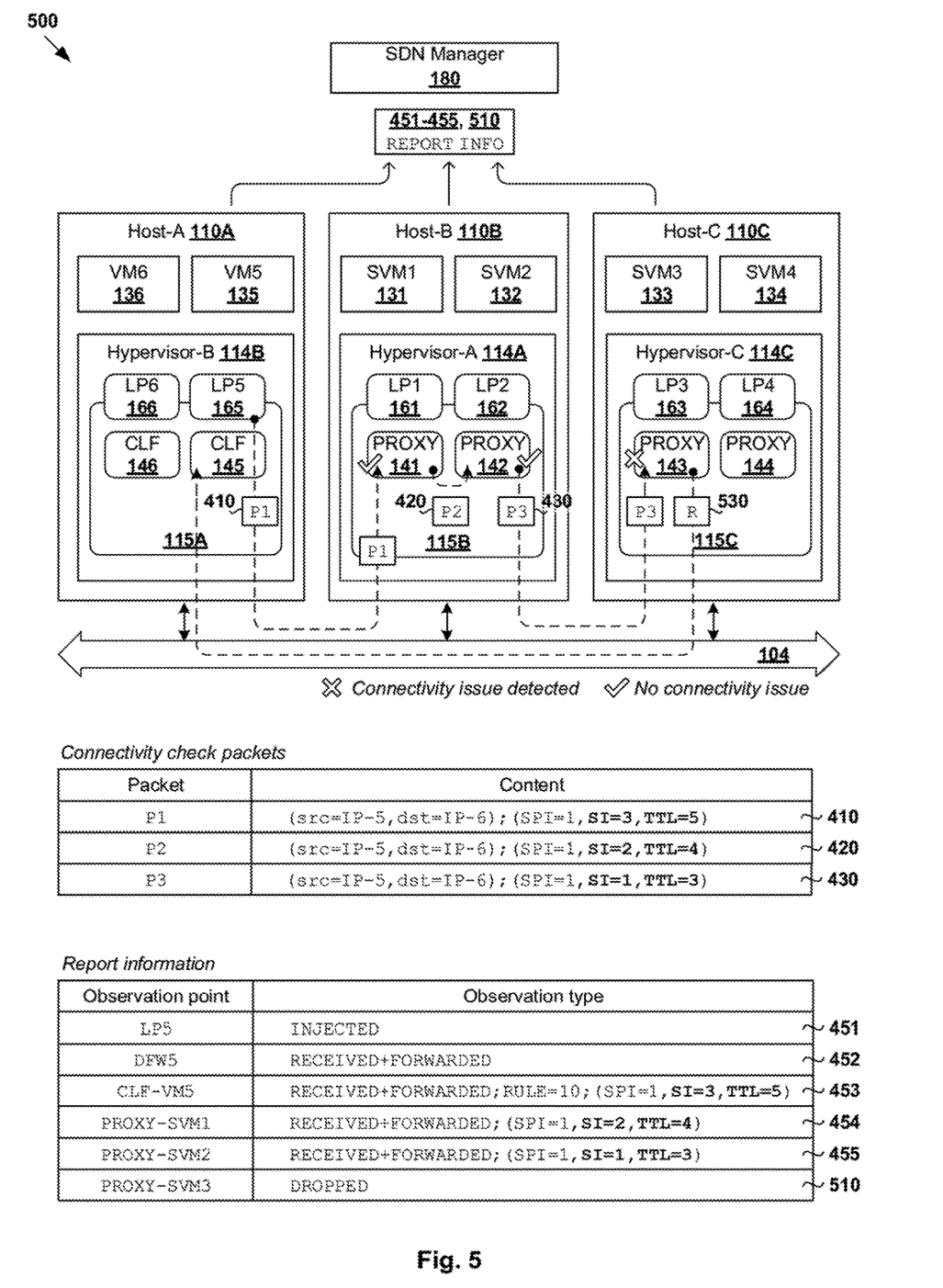
FIG. 5 is a schematic diagram illustrating a second example connectivity check with service insertion in which a connectivity issue is detected.

FIG. 5 is a schematic diagram illustrating second example connectivity check with service insertion in which a connectivity issue is detected. In contrast with FIG. 4, a connectivity issue between VM5 135 and VM6 136 may be detected at host-C 110C. In practice, connectivity check packet(s) may be dropped for various reasons, such as hardware failure, software failure, network failure, network congestion, firewall rule, invalid service path, SVM failure, invalid logical or physical network configuration, a combination thereof, etc.

In the example in FIG. 5, the failure of SVM3 133 causes the whole service path to fail. In this case, third proxy 143 may generate and send report information (see 510) specifying (ID=PROXY-SVM3, STATUS=DROPPED) to SDN manager 180. According to block 360 in FIG. 3, third proxy 143 may report the connectivity issue to service insertion classifier 145 associated with source VM5 135. This way, service insertion classifier 145 may identify that service path={SVM1, SVM2, SVM3} has failed, and select any available alternative service path for subsequent packets from VM5 135 to VM6 136. If there none is available, service insertion classifier 145 may apply a failure handling policy, such as to drop the packets.

According to block 365 in FIG. 3, SDN manager 180 may aggregate and analyze report information 451-455 and 510 from hosts 110A-C to identify a connectivity issue between VM3 135 and VM6 136, particularly at SVM3 143 based on (ID=PROXY-SVM3, STATUS=DROPPED). In other failure scenarios, SDN manager 180 might not receive an explicit "STATUS=DROPPED" report, such as when host-C 110C is shut down, there is an uplink error, etc. In this case, SDN manager 180 may rely on other report information (with the correct order) until the last working observation point reporting STATUS=RECEIVED and/or FORWARDED to identify where the packet is dropped. For example, if host-C 110C is down or there is a problem with a physical switch between host-B 110B and host-C 110C, the last working observation point might be PNIC 124B on host-B 110B.

Processing Using SVM

Depending on the desired implementation, connectivity check packets 410-430 may be delivered to respective SVMs 131-133, instead of bypassing them in the examples in FIGS. 4-5. Some examples will be discussed using FIGS. 6-7. FIG. 6 is a schematic diagram illustrating third example 600 of connectivity check with service insertion in which no connectivity issue is detected. FIG. 7 is a schematic diagram illustrating fourth example 700 of connectivity check with service insertion in which a connectivity issue is detected.

Figure 6:
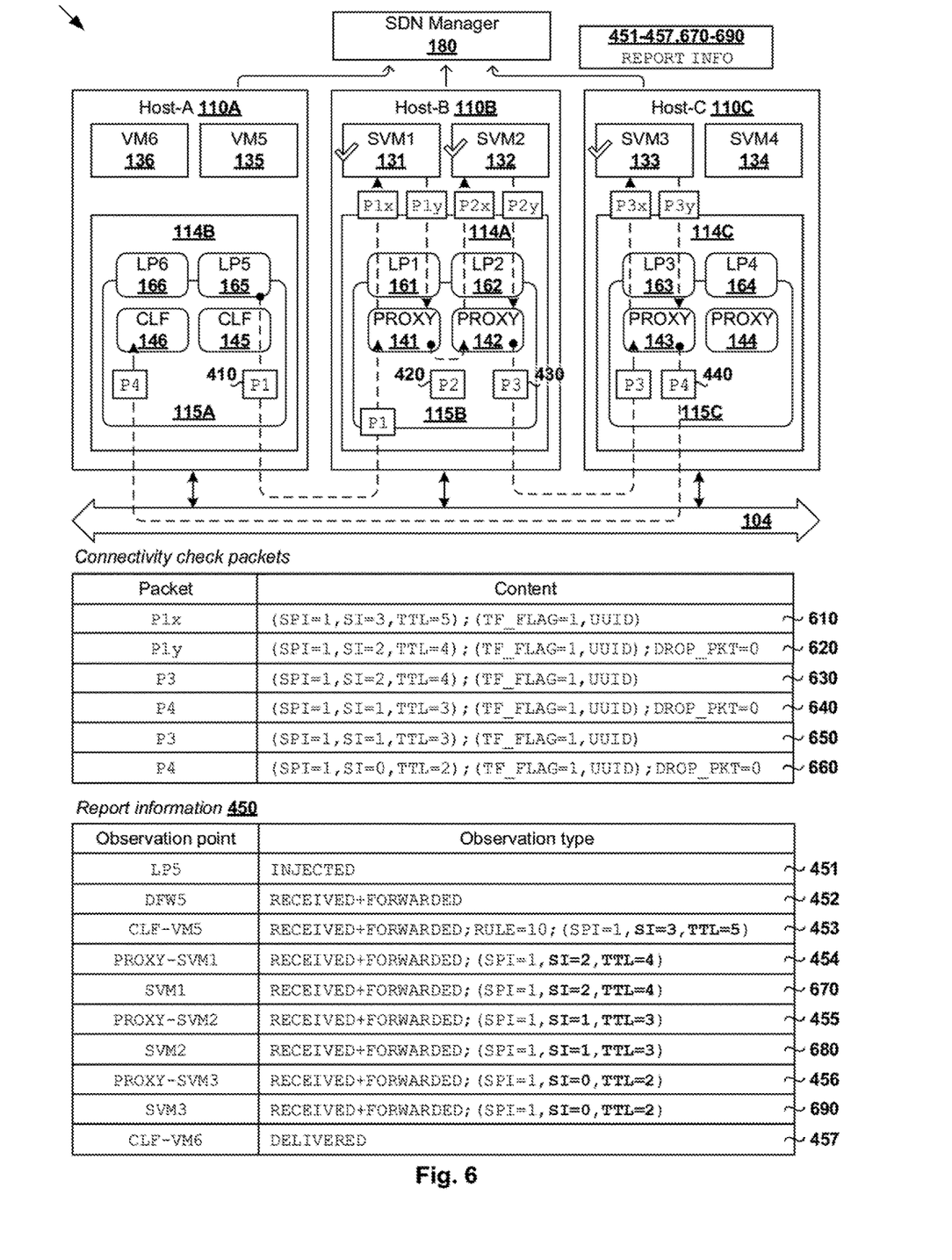
FIG. 6 is a schematic diagram illustrating a third example connectivity check with service insertion in which no connectivity issue is detected.

(a) No Connectivity Issue (FIG. 6)

Referring to FIG. 3 again, connectivity issue detection at block 332 may involve packet processing by SVM1 131. At 370 and 371, first proxy 141 may modify "P1" 410 to include metadata for first proxy 141 to recognize that it is a connectivity check packet after being processed by SVM1 131. For example, modified packet "P1x" 610 may include a one-bit metadata or flag (e.g., TF_FLAG=1) and/or a UUID in its payload (e.g., last 16 bytes). This way, first proxy 141 may distinguish between diagnostic traffic (i.e., connectivity check packets) and non-diagnostic traffic at block 390. Further, at 372, modified packet "P1x" 610 may be stripped of connectivity check attribute(s) to transform it into a regular data packet processable by SVM1 131.

For example, the UUID may identify a connectivity check session and/or a probe packet within that session. Where there are multiple simultaneous sessions, the UUID may be used to determine whether a connectivity check packet returning from SVM1 131 belongs to a current session or has long expired due to a performance issue (e.g., high latency) at SVM1 131. After being stripped of its connectivity check attribute(s), modified packet "P1x" 610 may be identified to be a connectivity check packet based on (TF_FLAG, UUID). In practice, connectivity check attribute(s) may be stripped to, for example, protect implementation details (e.g., internal formats and/or APIs) from third parties, such as vendors associated with SVMs 131-134.

At 375 and 385 in FIG. 3, SVM1 131 may process modified packet "P1x" 610 according to a service (e.g., NAT) provided by SVM1 131 and respond with processed packet "P1y" 620. Here, SVM1 131 may be configured to never drop an ingress packet that includes TF_FLAG=1, and to retain the UUID in the last 16 bytes of the payload.

At 380 in FIG. 3, if SVM1 131 decides to drop modified packet "P1x" 610, processed packet "P1y" 620 may be configured to include action=DROP_PKT to delegate the drop action to first proxy 141. Modified packet "P1x" 610 may be dropped for any suitable reason, such as internal logic or configuration, a matching rule with a drop action, etc.

At 390 in FIG. 3, first proxy 141 may detect that processed packet "P1y" 620 is for connectivity check (instead of regular traffic) based on (TF_FLAG=1, UUID, DROP_PKT=0) and restore its connectivity check attribute(s). If no connectivity issue is detected (e.g., DROP_PKT=0), blocks 340, 345 and 350 may be performed.

Blocks 370-390 may be repeated by second proxy 142 and SVM2 132 to generate modified packet "P2x" 630 and processed packet "P2y" 640, respectively. Similarly, third proxy 143 and SVM3 133 may perform blocks 370-390 to generate modified packet "P3x" 650 and processed packet "P3y" 660, respectively. In the example in FIG. 5, aggregated report information 451-457 received by SDN manager 180 is the same as in FIG. 4, the description of which is not repeated here for brevity.

Depending on the desired implementation, SVMs 131-133 may be added as observation points along the service path and configured to be aware of connectivity check packets. In this case, SVMs 131-133 may generate and send report information 670, 680 and 690 to SDN manager 180 to report whether they are really active (as opposed to assumption that they are active by respective proxies 141-143). Report information 670/680/690 may include STATUS=RECEIVED and FORWARDED and service insertion information discussed above.

Figure 7:
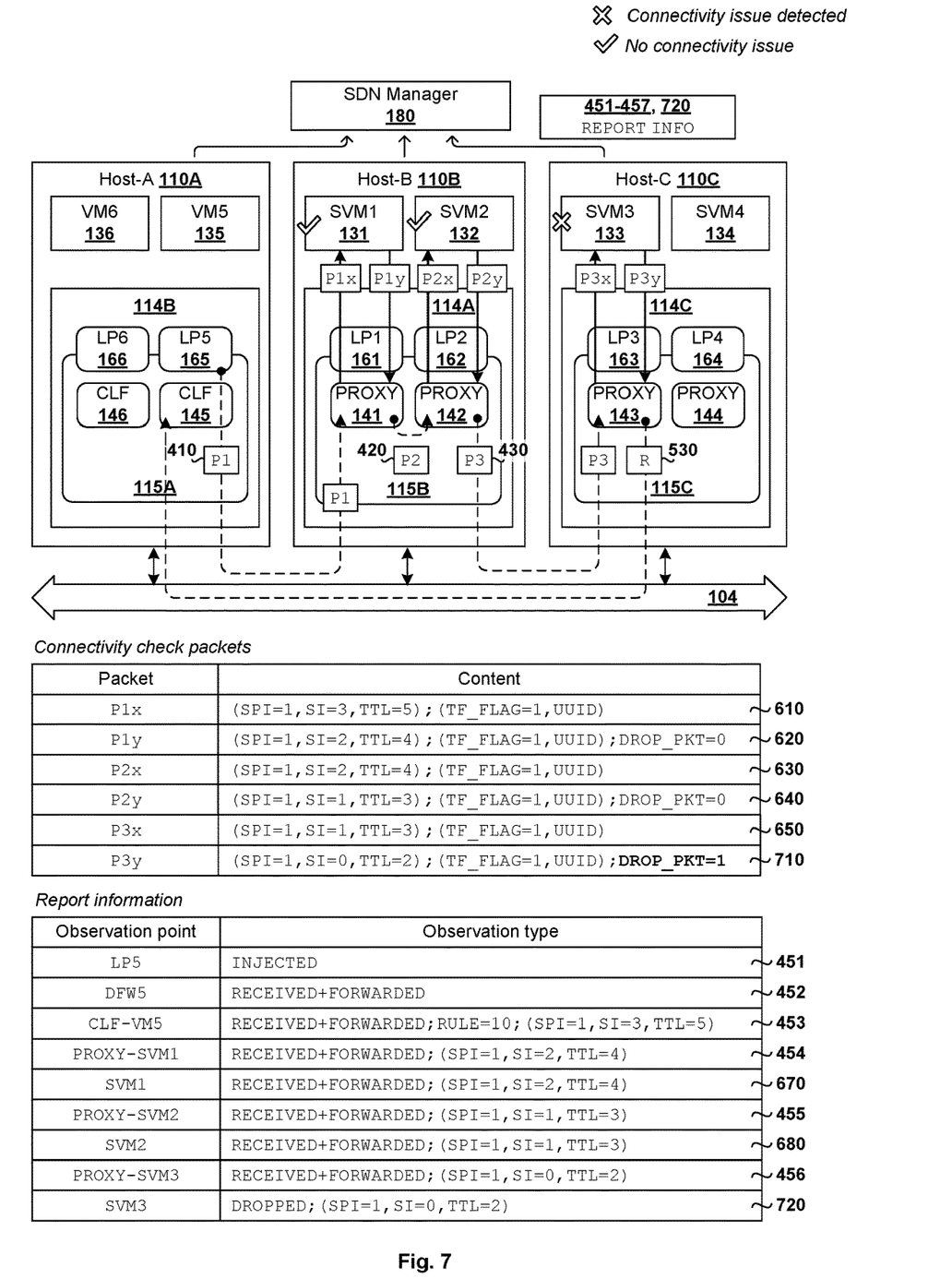
FIG. 7 is a schematic diagram illustrating a fourth example connectivity check with service insertion in which a connectivity issue is detected.

(b) Connectivity Issue Detected (FIG. 7)

In response to detecting a connectivity issue, blocks 355 and 360 may be performed. An example is shown in FIG. 7, which is a schematic diagram illustrating fourth example 700 of connectivity check with service insertion in which a connectivity issue is detected. Here, SVM3 133 may configure processed packet "P3y" 710 that includes DROP_PKT=1 to instruct third proxy 143 to drop the packet. Further, SVM3 133 may generate and send SDN manager 180 report information (see 720) specifying (ID=SVM3, STATUS=DROPPED).

Note that connectivity check packets (see 410-430), modified packets (see "P1x" 610, "P2x" 630 and "P3x" 650) and processed packets (see "P1y" 620, "P2y" 640 and "P3y" 660) have been explained using FIGS. 4-6. Further, as explained using FIG. 5, third proxy 143 may also report the connectivity issue (see 530 in both FIGS. 5 and 7) to source host-A 110A such that a failure handling policy may be implemented. The description of these packets, as well as associated operation(s), is not repeated here for brevity. Aggregated report information 451-455 received by SDN manager 180 have been explained using FIG. 5, and 670-680 using FIG. 6.

Depending on the desired implementation, first proxy 141 and/or SVM1 131 may perform any alternative or additional operation(s) to facilitate service processing. In practice, more changes may be needed to facilitate stateful analysis of traffic, or layer-7 inspection for SVM1 131. For example, when SVM1 131 is configured for packet encryption, additional operation(s) may be performed to ensure that the last 16 bytes of the packet payload are always preserved as-is throughout any layer-7 modification. In another example, to support reclassification, connectivity check packets may follow a different service chain if SVMs 131-134 have the capability to switch packets from one service path to another, such as using network function virtualization (NFV) solutions.

Container Implementation

Although explained using VMs 131-136, SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (i.e., "containers-on-VM") not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as host 110A/110B/110C may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a computer system to perform connectivity check with service insertion, wherein the computer system supports a first service virtualized computing instance and the method comprises:
   receiving a connectivity check packet that is injected for forwarding along a service path between a source virtualized computing instance and a destination virtualized computing instance; and
   in response to detecting a connectivity issue associated with the service path, generating and sending first report information identifying the first service virtualized computing instance located on the service path and an observation that the connectivity check packet is dropped;
   otherwise, in response to detecting no connectivity issue associated with the service path,
      forwarding the connectivity check packet towards a second virtualized computing instance, being a next-hop on the service path, or the destination virtualized computing instance; and
      generating and sending second report information identifying the first service virtualized computing instance and an observation that the connectivity check packet is forwarded.

2. The method of claim 1, wherein detecting the connectivity issue comprises:
   processing, by the first service virtualized computing instance, the connectivity check packet according to a service.

3. The method of claim 2, wherein detecting the connectivity issue comprises:
   receiving, by a service proxy supported by the computer system, a processed connectivity check packet from the first service virtualized computing instance; and
   based on content of the processed connectivity check packet, detecting the connectivity issue and dropping the processed connectivity check packet.

4. The method of claim 2, wherein detecting the connectivity issue comprises:
   prior to sending the connectivity check packet to the first service virtualized computing instance, the service proxy modifying the connectivity check packet to include metadata to be retained by the first service virtualized computing instance during processing.

5. The method of claim 1, wherein detecting the connectivity issue comprises:
   bypassing, by a service proxy supported by the computer system, the first service virtualized computing instance by not sending the connectivity check packet to the first service virtualized computing instance.

6. The method of claim 1, wherein receiving the connectivity check packet comprises:
   receiving, by a service proxy supported by the computer system, the connectivity check packet specifying service insertion information that includes a service path identifier (SPI) associated with the service path and a service index, wherein the service insertion information is configured by a service insertion classifier associated with the source virtualized computing instance.

7. The method of claim 1, wherein sending the first report information comprises at least one of the following:
   sending the first report information to cause a management entity to determine a connectivity status associated with the service path; and
   sending the first report information to cause a source host supporting the source virtualized computing instance to select a different service path or implement a failure handling policy.

8. A non-transitory computer-readable storage medium that includes a set of instructions which, in response to execution by a processor of a computer system, cause the processor to perform a method of connectivity check with service insertion, wherein the method comprises:
   receiving a connectivity check packet that is injected for forwarding along a service path between a source virtualized computing instance and a destination virtualized computing instance; and
   in response to detecting a connectivity issue associated with the service path, generating and sending first report information identifying a first service virtualized computing instance located on the service path and an observation that the connectivity check packet is dropped;
   otherwise, in response to detecting no connectivity issue associated with the service path,
      forwarding the connectivity check packet towards a second virtualized computing instance, being a next-hop on the service path, or the destination virtualized computing instance; and
      generating and sending second report information identifying the first service virtualized computing instance and an observation that the connectivity check packet is forwarded.

9. The non-transitory computer-readable storage medium of claim 8, wherein detecting the connectivity issue comprises:
   processing, by the first service virtualized computing instance, the connectivity check packet according to a service.

10. The non-transitory computer-readable storage medium of claim 9, wherein detecting the connectivity issue comprises:
    receiving, by a service proxy supported by the computer system, a processed connectivity check packet from the first service virtualized computing instance; and
    based on content of the processed connectivity check packet, detecting the connectivity issue and dropping the processed connectivity check packet.

11. The non-transitory computer-readable storage medium of claim 9, wherein detecting the connectivity issue comprises:
prior to sending the connectivity check packet to the first service virtualized computing instance, the service proxy modifying the connectivity check packet to include metadata to be retained by the first service virtualized computing instance during processing.

12. The non-transitory computer-readable storage medium of claim 8, wherein detecting the connectivity issue comprises:
bypassing, by a service proxy supported by the computer system, the first service virtualized computing instance by not sending the connectivity check packet to the first service virtualized computing instance.

13. The non-transitory computer-readable storage medium of claim 8, wherein receiving the connectivity check packet comprises:
receiving, by a service proxy supported by the computer system, the connectivity check packet specifying service insertion information that includes a service path identifier (SPI) associated with the service path and a service index, wherein the service insertion information is configured by a service insertion classifier associated with the source virtualized computing instance.

14. The non-transitory computer-readable storage medium of claim 8, wherein sending the first report information comprises at least one of the following:
sending the first report information to cause a management entity to determine a connectivity status associated with the service path; and
sending the first report information to cause a source host supporting the source virtualized computing instance to select a different service path or implement a failure handling policy.

15. A computer system, comprising:
a processor; and
a non-transitory computer-readable medium having stored thereon instructions that, when executed by the processor, cause the processor to:
receive a connectivity check packet that is injected for forwarding along a service path between a source virtualized computing instance and a destination virtualized computing instance; and
in response to detecting a connectivity issue associated with the service path, generate and send first report information identifying a first service virtualized computing instance located on the service path and an observation that the connectivity check packet is dropped;
otherwise, in response to detecting no connectivity issue associated with the service path,
forward the connectivity check packet towards a second virtualized computing instance, being a next-hop on the service path, or the destination virtualized computing instance; and
generate and send second report information identifying the first service virtualized computing instance and an observation that the connectivity check packet is forwarded.

16. The computer system of claim 15, wherein the instructions for detecting the connectivity issue cause the processor to:
process, by the first service virtualized computing instance, the connectivity check packet according to a service.

17. The computer system of claim 16, wherein the instructions for detecting the connectivity issue cause the processor to:
receive, by a service proxy supported by the computer system, a processed connectivity check packet from the first service virtualized computing instance; and
based on content of the processed connectivity check packet, detect the connectivity issue and dropping the processed connectivity check packet.

18. The computer system of claim 16, wherein the instructions for detecting the connectivity issue cause the processor to:
prior to sending the connectivity check packet to the first service virtualized computing instance, the service proxy modifying the connectivity check packet to include metadata to be retained by the first service virtualized computing instance during processing.

19. The computer system of claim 15, wherein the instructions for detecting the connectivity issue cause the processor to:
bypass, by a service proxy supported by the computer system, the first service virtualized computing instance by not sending the connectivity check packet to the first service virtualized computing instance.

20. The computer system of claim 15, wherein the instructions for receiving the connectivity check packet cause the processor to:
receive, by a service proxy supported by the computer system, the connectivity check packet specifying service insertion information that includes a service path identifier (SPI) associated with the service path and a service index, wherein the service insertion information is configured by a service insertion classifier associated with the source virtualized computing instance.

21. The computer system of claim 15, wherein the instructions for sending the first report information cause the processor to perform at least one of the following:
send the first report information to cause a management entity to determine a connectivity status associated with the service path; and
send the first report information to cause a source host supporting the source virtualized computing instance to select a different service path or implement a failure handling policy.

* * * * *